United States Patent
Kobayashi et al.

(10) Patent No.: US 11,835,880 B2
(45) Date of Patent: Dec. 5, 2023

(54) ROTATABLE POLYGON MIRROR, OPTICAL DEFLECTING DEVICE, SCANNING OPTICAL DEVICE, AND IMAGE FORMING APPARATUS

(71) Applicant: CANON KABUSHIKI KAISHA, Tokyo (JP)

(72) Inventors: Hisanori Kobayashi, Kanagawa (JP); Takatoshi Tanaka, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/750,092

(22) Filed: May 20, 2022

(65) Prior Publication Data

US 2022/0373925 A1 Nov. 24, 2022

(30) Foreign Application Priority Data

May 24, 2021 (JP) ................. 2021-087164

(51) Int. Cl.
*G03G 15/04* (2006.01)
*G02B 26/12* (2006.01)

(52) U.S. Cl.
CPC ....... *G03G 15/04036* (2013.01); *G02B 26/12* (2013.01)

(58) Field of Classification Search
CPC ...... G03G 15/04036; G02B 26/12–129; G02B 5/09
See application file for complete search history.

(56) References Cited

U.S. PATENT DOCUMENTS

| 4,902,085 A * | 2/1990 | Murakoshi ............... G02B 5/09 359/216.1 |
| 6,151,151 A | 11/2000 | Ozaki ........................ 359/200.1 |
| 6,175,439 B1 * | 1/2001 | Ozaki .................. G02B 26/121 359/198.1 |
| 6,201,624 B1 | 3/2001 | Ozaki et al. ............... 359/200.1 |
| 10,451,779 B2 | 10/2019 | Kurita et al. ............ G02B 5/09 |
| 2002/0075916 A1 | 6/2002 | Sato et al. ...................... 372/36 |
| 2008/0063023 A1 | 3/2008 | Azami et al. ................. 372/107 |
| 2016/0171350 A1 | 6/2016 | Kobayashi et al. ........... 358/1.7 |

(Continued)

FOREIGN PATENT DOCUMENTS

| JP | S64-29813 | 1/1989 |
| JP | H11-337855 | 12/1999 |

(Continued)

*Primary Examiner* — Carla J Therrien
(74) *Attorney, Agent, or Firm* — Venable LLP (57) ABSTRACT

A rotatable polygon mirror including a plurality of reflecting surfaces includes first and second surfaces connecting to the reflecting surfaces provided on opposite ends, first and second protrusion portions with an annular shape, provided on the first and second surfaces and protruding inversely to each other in the rotational axis direction, about a rotational axis of the rotatable polygon mirror. A height of a top surface portion of the first protrusion portion from the first surface is higher than that of a top surface portion of the second protrusion portion from the second surface with respect to the rotational axis direction. In a case that the rotatable polygon mirrors are stacked in the rotational axis direction, a wall of an inner peripheral side of the first protrusion portion and a wall of an outer peripheral side of the second protrusion portion are engaged with each other.

15 Claims, 9 Drawing Sheets

(56) References Cited

U.S. PATENT DOCUMENTS

| | | | |
|---|---|---|---|
| 2017/0097450 A1* | 4/2017 | Hoshino | G02B 5/09 |
| 2020/0122483 A1 | 4/2020 | Tanaka et al. | G02B 26/127 |
| 2021/0033851 A1* | 2/2021 | Kobayashi | G03G 15/04072 |
| 2021/0041801 A1 | 2/2021 | Ohta et al. | H04N 1/0283 |

FOREIGN PATENT DOCUMENTS

| | | |
|---|---|---|
| JP | 2000-002851 | 1/2000 |
| JP | 2010-191470 | 9/2010 |
| JP | 2017-126008 | 7/2017 |

* cited by examiner

ROTATABLE POLYGON MIRROR, OPTICAL DEFLECTING DEVICE, SCANNING OPTICAL DEVICE, AND IMAGE FORMING APPARATUS

FIELD OF THE INVENTION AND RELATED ART

The present invention relates to a rotatable polygon mirror, an optical deflecting device which is provided with the rotatable polygon mirror, a scanning optical device which is provided with the optical deflecting device, and an image forming apparatus which is provided with the scanning optical device.

An optical deflecting device which deflects laser light emitted from a light source according to an image signal is mounted on an image forming apparatus of an electrophotographic method such as a laser printer. A rotatable polygon mirror which reflects the laser light is mounted on the optical deflecting device.

Figure 8:
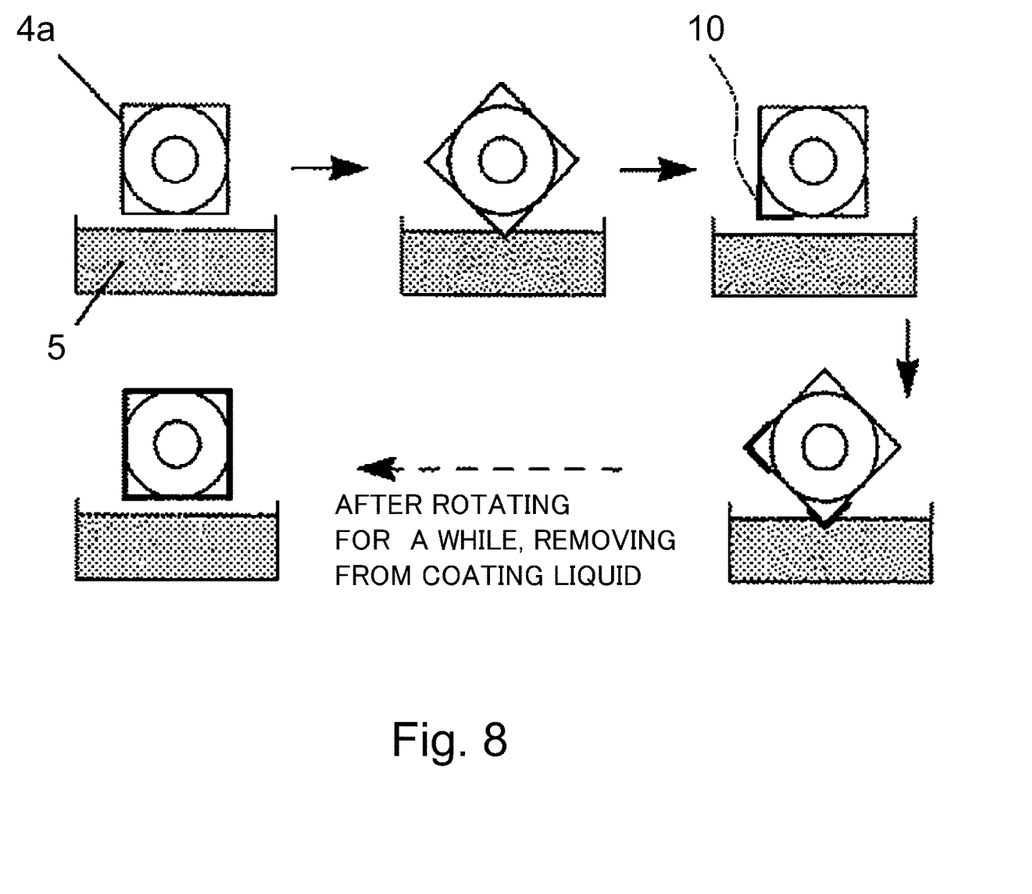
FIG. 8 is a schematic view illustrating a film forming and application process of the rotatable polygon mirror according to a conventional example.

For example, in Japanese Laid-Open Patent Application (JP-A) 2010-191470, a film forming process of a rotatable polygon mirror is proposed. As material for the rotatable polygon mirror, for example, aluminum, glass, etc. are used. Then, during the film forming process of the rotatable polygon mirror, a reflectivity is increased, an angle dependence is eliminated, and an oxidation is prevented by applying an evaporated film or an anodic oxide film to a reflecting surface of the rotatable polygon mirror. FIG. 8 is a view illustrating a process of applying coating liquid to the reflecting surface of the rotatable polygon mirror which is described in JP-A 2010-191470. FIG. 8 will be described clockwise from an upper left one. First, in order to form a reflecting film on the rotatable polygon mirror, the rotatable polygon mirror is set above the coating liquid so that it does not come into contact with the coating liquid. At this time, as shown in FIG. 8, the rotatable polygon mirror is set so that a distance between a rotational axis of the rotatable polygon mirror and a surface of the coating liquid is greater than a minimum distance between the rotational axis of the rotatable polygon mirror and the reflecting surface of the rotatable polygon mirror. Then, next, the rotatable polygon mirror is rotated and the coating liquid is applied to corner portions of the rotatable polygon mirror (an area which is indicated as 10 in FIG. 8). By rotating the rotatable polygon mirror, the coating liquid is wetted and spread over the reflecting surface, and eventually the coating liquid is applied to an entire reflecting surface 4a. In this way, the coating liquid is possible to be completely applied and spread over the reflecting surface, without completely immersing the reflecting surface of the rotatable polygon mirror in the coating liquid.

Figure 9:
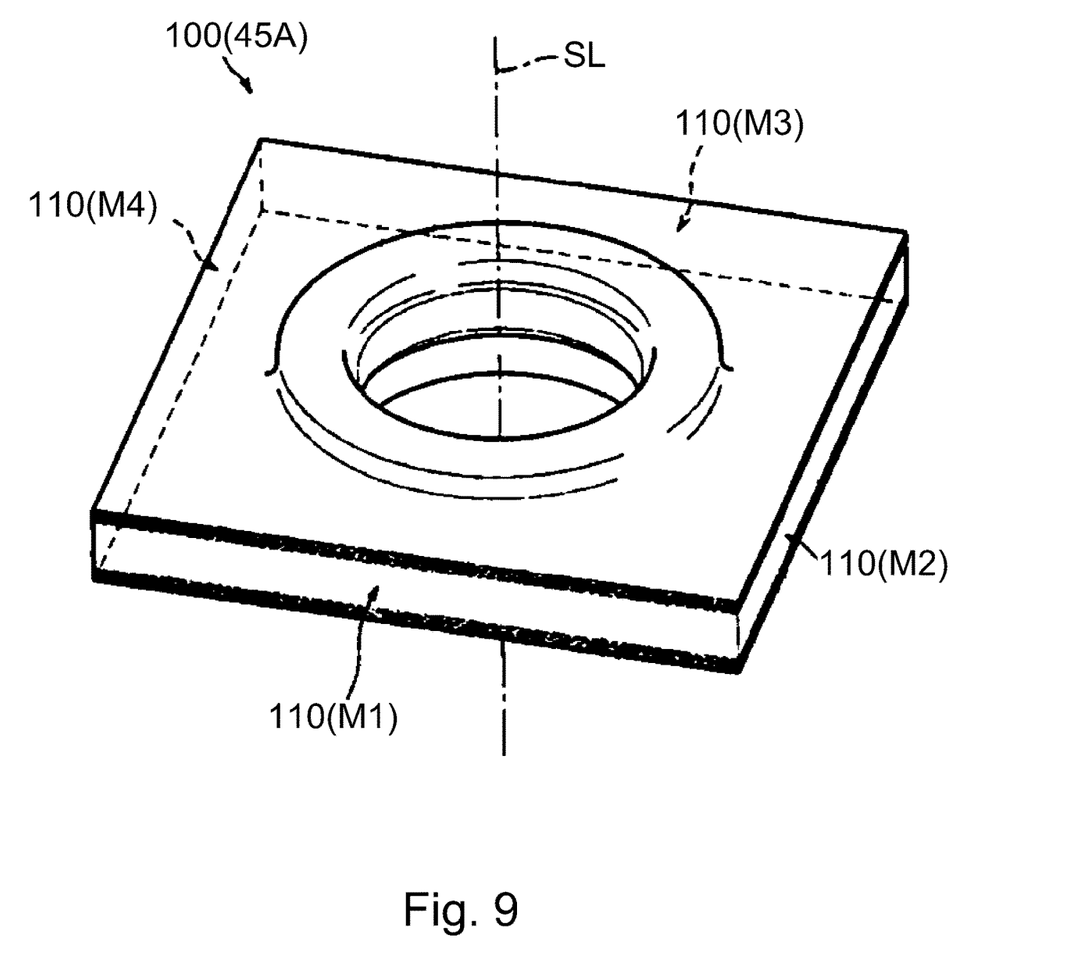
FIG. 9 is a perspective view illustrating the constitution of the rotatable polygon mirror according to the conventional example.

Further, for example, in JP-A 2017-126008, a rotatable polygon mirror which is formed from resin is proposed. FIG. 9 is a view illustrating a constitution of the rotatable polygon mirror which is proposed in JP-A 2017-126008. In FIG. 9, the rotatable polygon mirror 45A is a rotatable polygon mirror which includes four mirror surfaces from M1 through M4 which are arranged around a predetermined rotational axis SL. A base material 100 is formed from, for example, resin, and includes four side surfaces 110 which correspond to the mirror surfaces from M1 through M4. In the rotatable polygon mirror 45A, a reflecting film is formed on each side surface 110, so the surface of the reflecting film constitutes the mirror surfaces from M1 through M4. In this way, it is contrived that the rotatable polygon mirror is formed from resin material instead of metal.

In order to suppress dependence of a reflectivity on an incidence angle of light entering the reflecting surface, for example, a monolayer film of a material with a desired refractive index is formed on the reflecting surface of the rotatable polygon mirror. The monolayer film is formed by a vacuum film forming method such as vapor deposition and sputtering, or by a wet film forming method using liquid solution. The patent document described above discloses a method of forming a monolayer film while a plurality of the rotatable polygon mirrors, which are objects of film forming, are stacked and multiple mounted through an axis.

In such a manufacturing process, when stacking a plurality of the rotatable polygon mirror mirrors, in a case that a clearance, a rotational phase etc. between the reflecting surfaces of two adjacent rotatable polygon mirrors in a direction of the axis, are not regulated, uneven film thickness may partially occur on an inner diameter of a rotational shaft of the rotatable polygon mirror or a pedestal portion of the rotatable polygon mirror which is mounted on a rotor portion of a motor. For example, in a case that uneven film thickness occurs partially in the pedestal portion of the rotatable polygon mirror, an assembly accuracy may be damaged when the rotatable polygon mirror is mounted on the optical deflecting device and an irregular pitch of a scanning line may occur due to a plane tilt of the reflecting surface. Further, in a case that uneven film thickness is partially occurred in the inner diameter of the rotational shaft of the rotatable polygon mirror, an image quality may be damaged, since an optical performance is deteriorated due to surface deformation of the reflecting surface by an error in engagement between the rotational shaft of the rotatable polygon mirror and a rotational shaft of the optical deflecting device, etc. Therefore, it is necessary to prevent from forming film on various surfaces of the rotatable polygon mirror, which affects the assembly accuracy of the rotatable polygon mirror.

In response to the above issue, an object of the present invention is to provide a rotatable polygon mirror which prevents from forming film on surfaces that affect assembly accuracy of the rotatable polygon mirror during a film forming process of the rotatable polygon mirror.

SUMMARY OF THE INVENTION

In order to solve the problem described above, the present invention is provided with a following constitution.

According to an aspect of the present invention, there is provided a rotatable polygon mirror including a plurality of reflecting surfaces comprising, a first surface connecting to the plurality of reflecting surfaces, a second surface connecting to the plurality of reflecting surfaces and provided on a side opposite to the first surface with respect to a rotational axis direction, a first protrusion portion with an annular shape, provided on the first surface and protruding in the rotational axis direction, about a rotational axis of the rotatable polygon mirror and a second protrusion portion with an annular shape, provided on the second surface and protruding in an opposite direction to a protrusion direction of the first protrusion portion, about the rotational axis of the rotatable polygon mirror, wherein the second protrusion portion is a part to be set on a rotor of a motor, wherein a height of a top surface portion of the first protrusion portion from the first surface is higher than a height of a top surface portion of the second protrusion portion from the second surface with respect to the rotational axis direction, and wherein, in a case that a plurality of the rotatable polygon mirrors are stacked in the rotational axis direction, a wall of an inner peripheral side of the first protrusion portion and a wall of an outer peripheral side of the second protrusion portion are engaged with each other.

Further features of the present invention will become apparent from the following description of exemplary embodiments (with reference to the attached drawings).

DESCRIPTION OF THE EMBODIMENTS

In the following, the embodiments of the present invention will be specifically described with reference to the figures.

First Embodiment

[Constitution of the Image Forming Apparatus]

Figure 1:
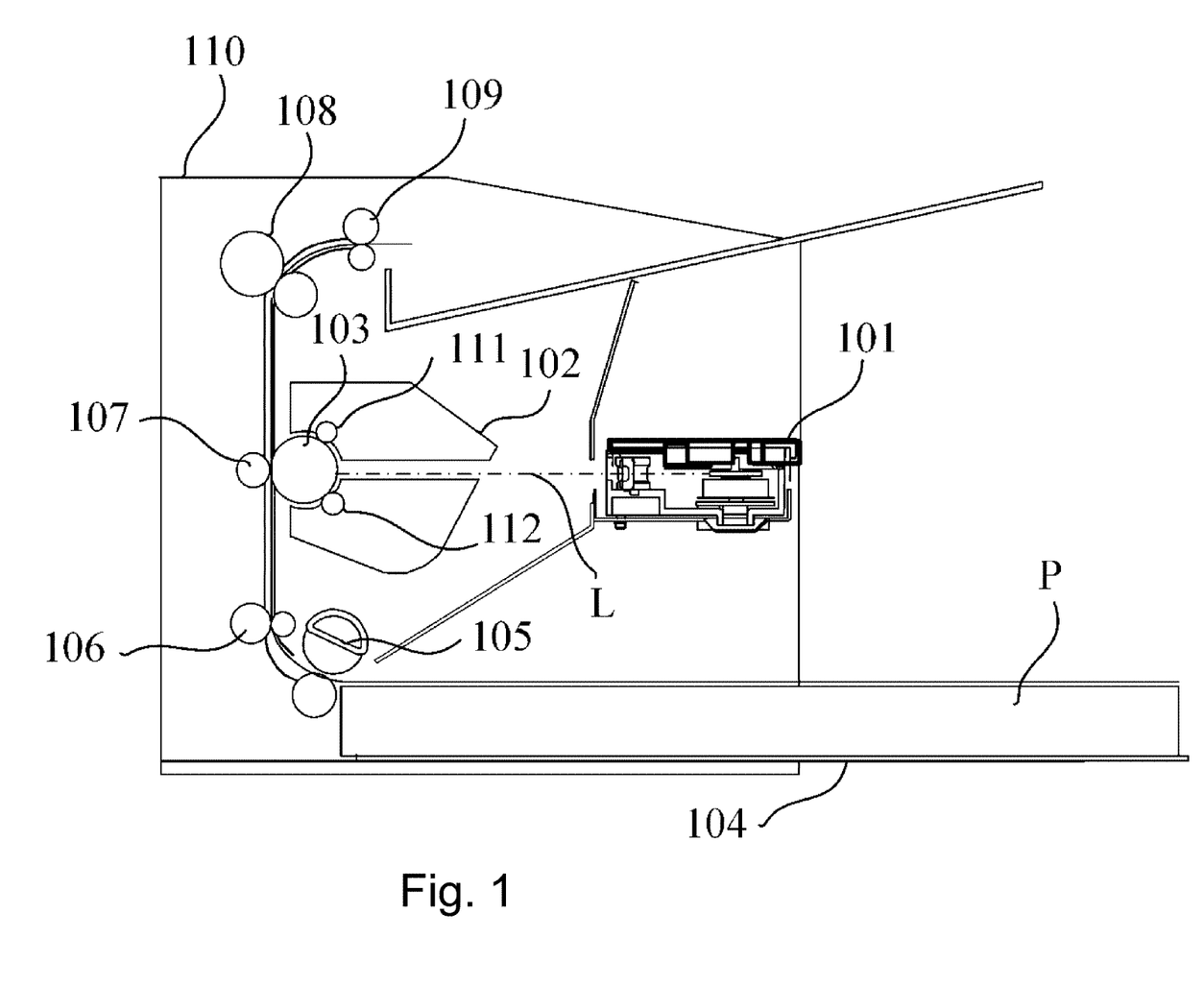
FIG. 1 is a sectional view showing a constitution of an image forming apparatus according to a first embodiment, a second embodiment, and a third embodiment.

FIG. 1 is a schematic sectional view showing a constitution of an image forming apparatus 110 according to the first embodiment. In FIG. 1, a process cartridge 102 which is an image forming portion includes a photosensitive drum 103 on which an electrostatic latent image is formed, and a charging roller 111 which charges the photosensitive drum 103 to a predetermined electrical potential. Furthermore, the process cartridge 102 includes a developing roller 112 which adheres toner to the electrostatic latent image which is formed on the photosensitive drum 103 and forms a toner image. At a position opposing the photosensitive drum 103 which is an image bearing member, a transfer roller 107, which transfers a toner image formed on the photosensitive drum 103 to a recording material P which is a recording medium which is fed, is arranged. Further, the scanning optical device 101 emits laser light L onto the photosensitive drum 103 according to an image data and forms an electrostatic latent image.

When the image forming apparatus 110 starts an image forming operation, in the process cartridge 102, the photosensitive drum 103 is rotationally driven, and the charging roller 111 charges a surface of the photosensitive drum 103 to a uniform electrical potential. The scanning optical device 101 emits laser light L to the surface of the photosensitive drum 103 which is charged to a uniform electrical potential according to image data and form an electrostatic latent image. And toner is adhered to the electrostatic latent image which is formed on the photosensitive drum 103 (on the image bearing member) by the developing roller 112 and a toner image is formed. On the other hand, from a sheet feeding portion 104 on which the recording material P is stacked, the feeding roller 105 feeds the recording material P one by one into a feeding passage. The recording material P which is fed to the feeding passage is further fed to the transfer roller 107 by a feeding roller 106. The toner image which is formed on the photosensitive drum 103 is transferred by the transfer roller 107 to the recording material P which is fed to the transfer roller 107.

The recording material P to which the toner image is transferred is fed to a fixing device 108, and the toner image on the recording material P is heated and pressurized by the fixing device 108 and is fixed on the recording material P. The recording material P on which the toner image is fixed is then discharged outside the image forming apparatus 110 by the discharging roller 109. Incidentally, in the embodiment, the charging roller 111 and the developing roller 112 are constituted to be integrated with the photosensitive drum 103 in the process cartridge 102, however, the charging roller 111 and the developing roller 112 may be constituted separately from the photosensitive drum 103.

[Constitution of the Scanning Optical Device]

Figure 2:
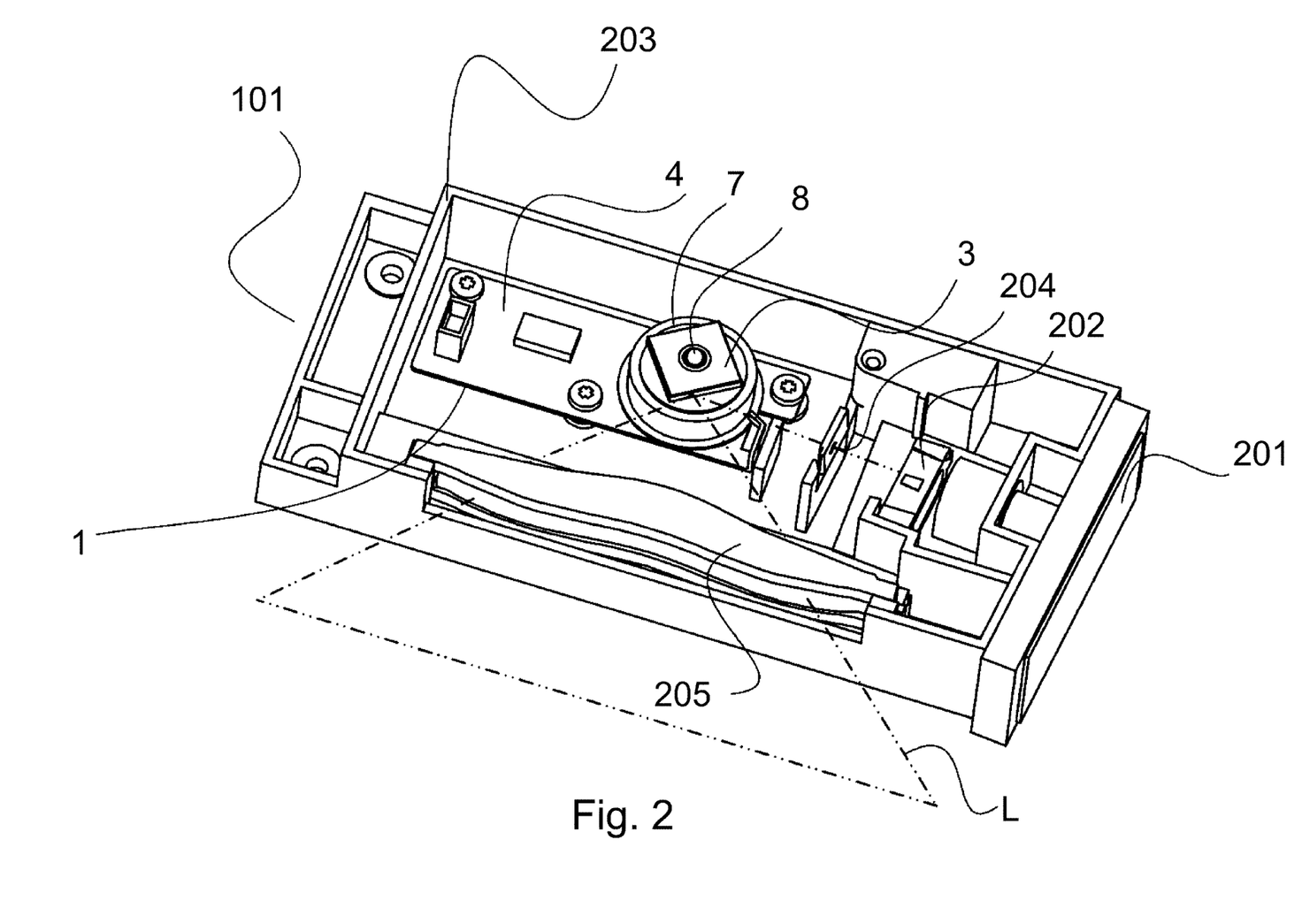
FIG. 2 is a perspective view showing a constitution of a scanning optical devise according to the first embodiment, the second embodiment, and the third embodiment.

The scanning optical device 101 will be described by using FIG. 2. FIG. 2 is the perspective view illustrating the constitution of the scanning optical device 101 and showing a state that a cover (not shown) which closes an inside of a casing 203 is removed.

The laser light L which is emitted from a light source unit 201 is converged in a subscanning direction by a cylindrical lens 202, and is limited to a predetermined beam diameter by an optical diaphragm 204 which is formed in a part of the casing 203. The laser light L which passes through the diaphragm 204 is deflected by a rotatable polygon mirror 3 which is mounted on a motor board 4 of an optical deflecting device 1 (see FIG. 3). After that, the laser light L passes through an fθ lens 205 and scans over the photosensitive drum 103 (not shown in FIG. 2) which is a scanned surface. The cylindrical lens 202, the optical deflecting device 1, and the fθ lens 205 are accommodated inside the casing 203, and the light source unit 201 is attached to a side wall of the casing 203 from an outside of the casing 203. Incidentally, a rotor 7 and a rotational shaft 8 will be described below.

[Constitution of the Optical Deflecting Device]

Next, the optical deflecting device 1 will be described by using FIG. 3. The optical deflecting device 1 includes the rotatable polygon mirror with the plurality of reflecting surfaces which reflect laser light, and a motor which rotates the rotatable polygon mirror, and the rotatable polygon mirror, which is rotatably driven by the motor, deflects the laser light L which is emitted from the light source unit 201.

Figure 3:
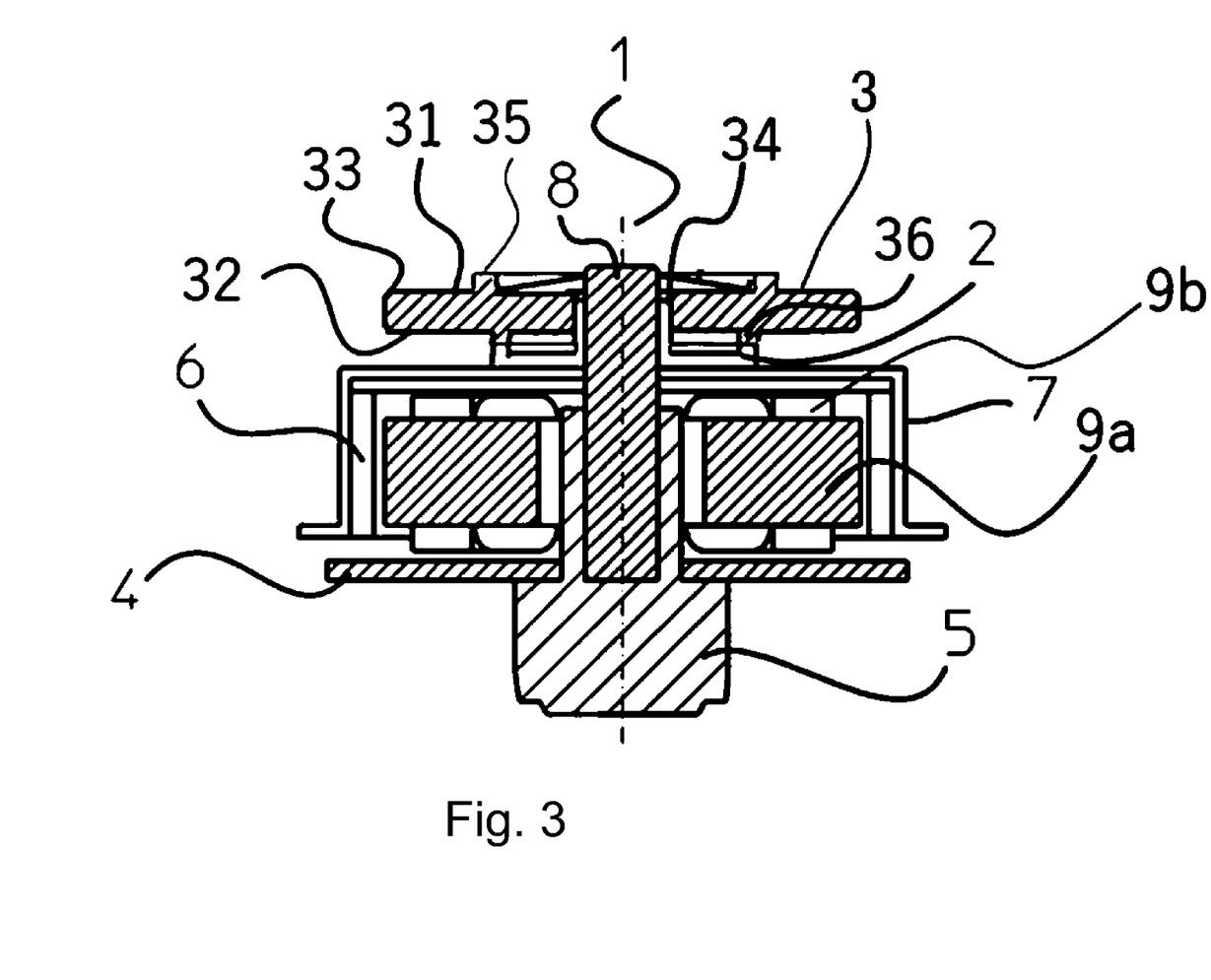
FIG. 3 is a sectional view illustrating a constitution of an optical deflecting device according to the first embodiment, the second embodiment, and the third embodiment.

FIG. 3 is a sectional view of the optical deflecting device 1. The optical deflecting device 1 includes a rotatable polygon mirror 3 which is formed from resin, and the rotatable polygon mirror 3 includes a reflecting surface 33 which reflects the laser light L. In addition to the rotatable polygon mirror 3, the optical deflecting device 1 includes the motor board 4 which is constituted of metal plate, a bearing sleeve 5 which is supported by the motor board 4, a stator core 9a which is fixed to the motor board 4, and a stator coil 9b which is fixed to the stator core 9a. Furthermore, the optical deflecting device 1 includes a rotor 7 which is provided with a rotor magnet 6, the rotational shaft 8 which is integrated with the rotor 7, and a supporting portion 2 which supports the rotatable polygon mirror 3.

In the optical deflecting device 1, when the stator core 9a is excited by a driving current which is supplied from a driving circuit which is provided with the motor board 4, the rotor 7 which mounts the rotatable polygon mirror 3 rotates at high speed. And the laser light L which is emitted from the light source unit 201 is deflected by the reflecting surface 33 of the rotatable polygon mirror 3 which rotates at high speed.

[Constitution of the Rotatable Polygon Mirror]

Figure 4:
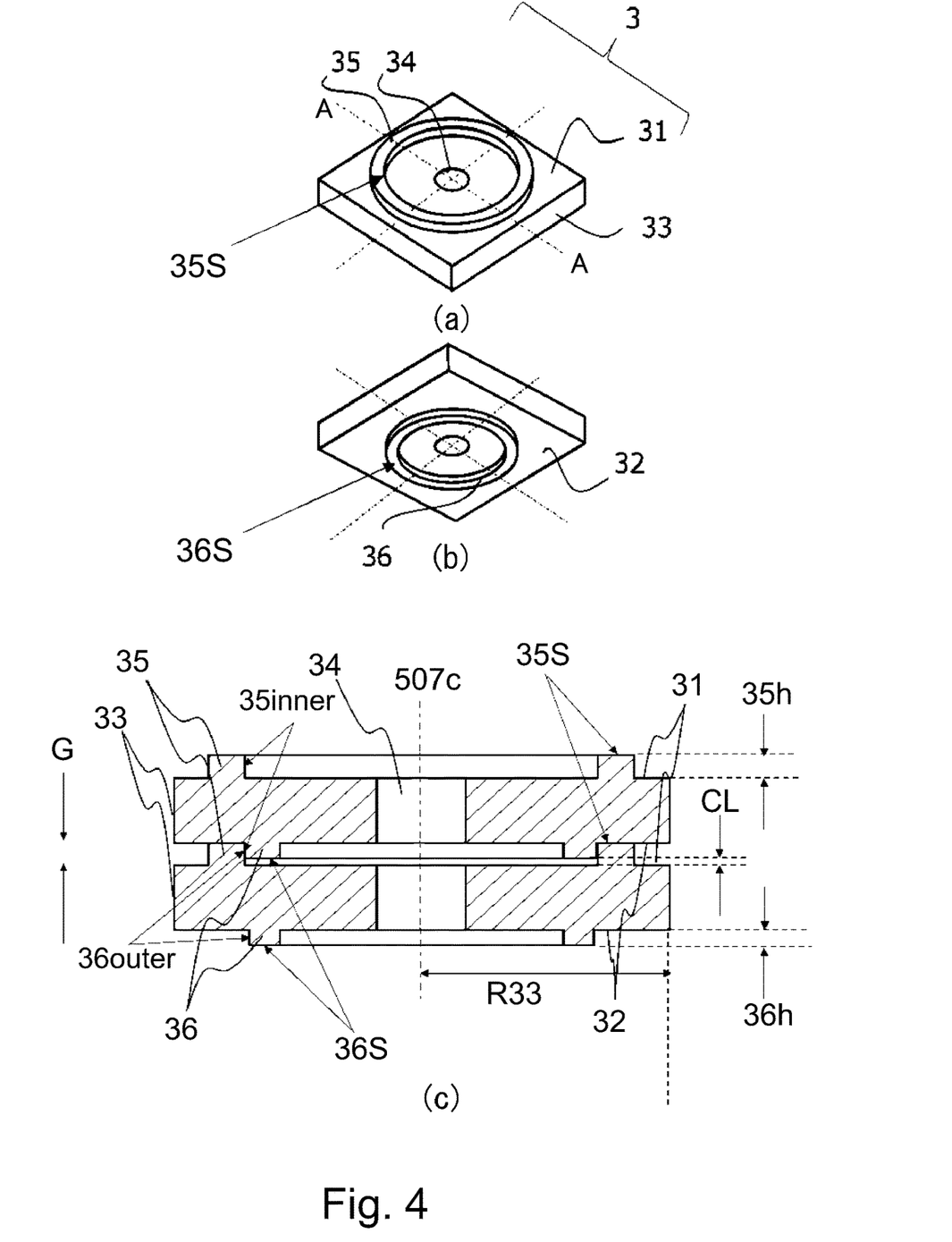
FIG. 4, parts (a) to (c), is a view illustrating a constitution of a rotatable polygon mirror according to the first embodiment.

Next, the rotatable polygon mirror 3 will be specifically described by using FIG. 4. Part (a) of FIG. 4 is a perspective view of the rotatable polygon mirror 3 which is described in FIG. 3 when it is viewed from diagonally above, and part (b) of FIG. 4 is a perspective view of the rotatable polygon mirror 3 when it is viewed from diagonally below. Further, part (c) of FIG. 4 is a sectional view of the rotatable polygon mirrors 3 when they are cut along line A-A in a state that two of the rotatable polygon mirrors are stacked as shown in part (a) of FIG. 4.

The rotatable polygon mirror 3 is formed from a resin material such as cyclo-olefin resin, polycarbonate resin, or acrylic resin. The rotatable polygon mirror 3 is in a form of a prism shape with a square bottom. The rotatable polygon mirror 3 includes the reflecting surface 33 which forms four side surfaces of the square, a first surface 31 which is a top surface which is perpendicular to the four reflecting surfaces 33, and a second surface 32 which is perpendicular to the four reflecting surface 33, is provided in an opposite side of the first surface 31 with respect to a direction of the rotational axis and is substantially parallel to the first surface 31. Furthermore, the rotatable polygon mirror 3 includes a center hole 34 which engages with the rotational shaft 8 of the rotor 7 shown in FIG. 3 and is a rotational center.

Further, the first surface 31 of the rotatable polygon mirror 3 is provided with a concentric (coaxial) annular shaped protrusion portion 35 (first protrusion portion) which is centered on the rotational shaft 8 in a direction of the rotational shaft 8 which is engaged with the rotatable polygon mirror 3. In a top surface portion of the protrusion portion 35, a flat surface 35S of a same height is formed. Similarly, in the second surface 32 of the rotatable polygon mirror 3, a concentric (coaxial) annular pedestal portion 36 (second protrusion portion) which is protruded in an opposite direction to a protruding direction of the protrusion portion 35 in the direction of the rotational axis and which is centered on the rotational shaft 8 is provided. The pedestal portion 36 is an accurate surface (machined surface) which is abutted with the supporting portion 2 in FIG. 3 described above, and in the top surface portion of the pedestal portion 36, a flat surface 36S of a same height is formed.

As shown in part (c) of FIG. 4, in a state that two of the rotatable polygon mirrors 3 are stacked on top of one another, the pedestal portion 36 of the rotatable polygon mirror 3 in an upper side enters an inside of the protrusion portion 35 of the rotatable polygon mirror 3 in a lower side in a radial direction, and they have a dimensional relationship so that an outer peripheral portion of the pedestal portion 36 (outer peripheral side wall 36outer in the radial direction) is engaged with the inner peripheral portion of the protrusion portion 35 (inner peripheral side wall 35 inner in the radial direction) over an entire peripheral direction (that is, the wall 36 outer and the wall 35 inner are in contact over the entire peripheral direction). When the protrusion portion 35 of the rotatable polygon mirror 3 is engaged with the pedestal portion 36 of the rotatable polygon mirror 3, a gap G is formed between two of the rotatable polygon mirrors 3. Further, in the rotatable polygon mirror 3, a height 36h of the top surface portion 36S of the pedestal portion 36 from the second surface 32 is constituted to be lower than a height 35h (=G) of the top surface portion 35S of the protrusion portion 35 from the first surface 31 (36h<35h). Thus, as shown in part (c) of FIG. 4, in a state that two of the rotatable polygon mirrors 3 are stacked on top of one another, the top surface portion 35S of the protrusion portion 35 of the rotatable polygon mirror 3 in the lower side is abutted with the second surface 32 of the rotatable polygon mirror 3 in the upper side. On the other hand, the top surface portion 36S of the pedestal portion 36 of the rotatable polygon mirror 3 in the upper side is not abutted with the first surface 31 of the rotatable polygon mirror 3 in the lower side, and it is in a state that a gap (clearance CL) is provided.

[Film Forming Device]

Figure 5:
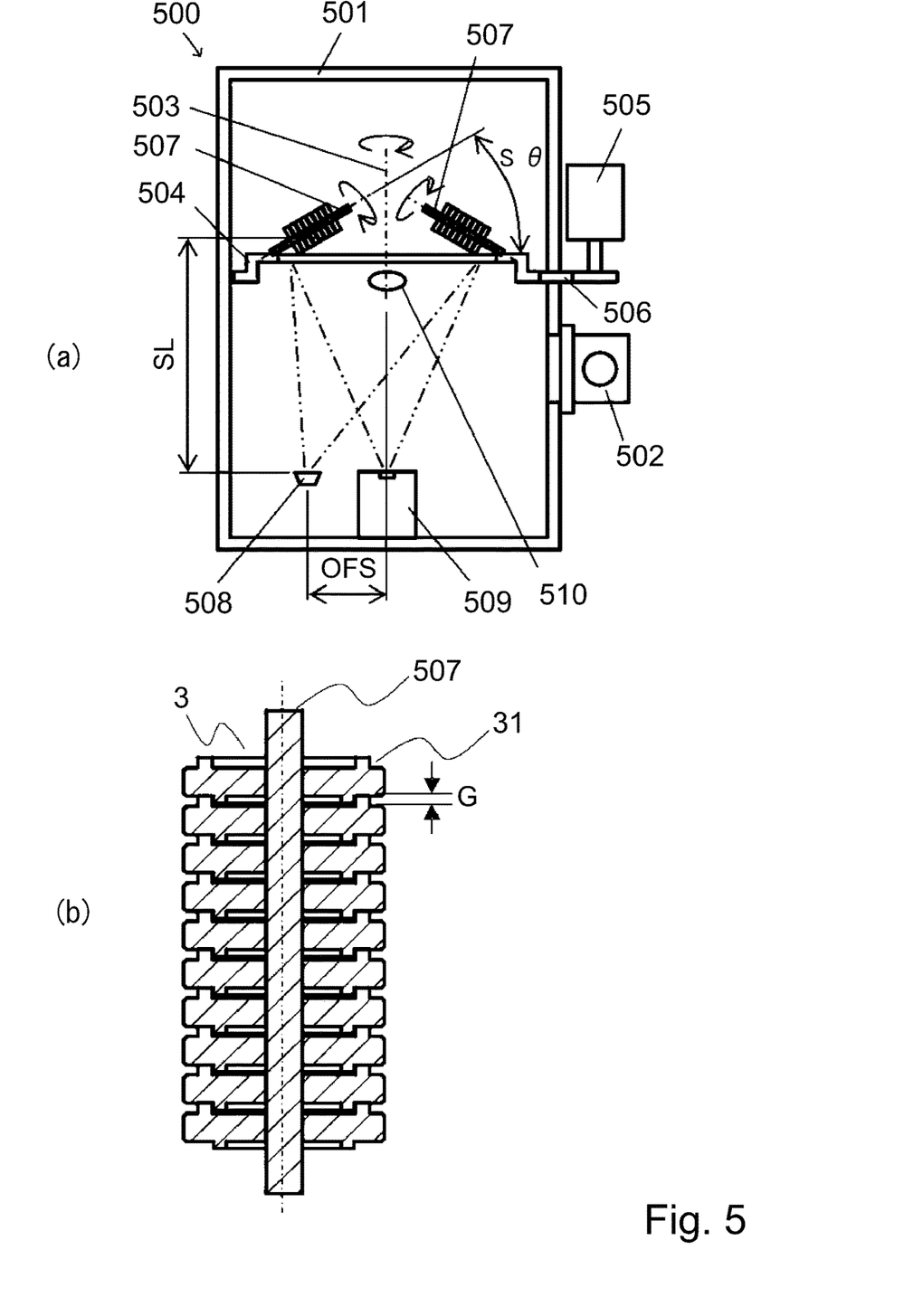
FIG. 5, parts (a) and (b), is a schematic constitution view of a film forming device according to the first embodiment, the second embodiment, and the third embodiment.

A constitution of the film forming device for forming multilayer film of the rotatable polygon mirror 3 in the embodiment will be described by using part (a) and part (b) of FIG. 5. Part (a) of FIG. 5 is a schematic view showing a constitution of a vacuum evaporating device as one of examples of the film forming device in the embodiment. A vacuum evaporating device 500 is provided with a film forming chamber 501 whose inside is maintained in a vacuum state and an exhaust system 502 which is constituted of a vacuum pump, etc. which sets the film forming chamber 501 to a vacuum state. In a film forming chamber 501, a revolution part 504 which performs a revolution driving around a revolving axis 503 is arranged, and the revolution part 504 is driven by a driving mechanism 505 via a gear 506 and performs the revolution driving. A single rotating shaft part 507 is passed through the center holes 34 respectively in the plurality of rotatable polygon mirrors 3 which are stacked on top of one another. While the plurality of rotatable polygon mirrors 3 are stacked, the rotating shaft part 507 is mounted at an angle of Sθ to a horizontal direction of the revolution part 504, and the rotating shaft part 507 is rotationally driven by an unshown mechanism. While the rotatable polygon mirror 3 is rotationally and revolvingly driven by the revolution driving of the revolution part 504 and the rotation driving around the rotating shaft part 507, a reflecting film with desired optical characteristics is formed on the surface of the reflecting surface 33.

Part (b) of FIG. 5 is a sectional view showing a close-up of the plurality of rotatable polygon mirrors 3 while the plurality of rotatable polygon mirrors 3 are stacked on the rotating shaft part 507. The plurality of rotatable polygon mirrors 3 are stacked in an axial direction of the rotating shaft part 507 which is a rotational axis, so that the first surface 31 faces upward. At this time, as shown in part (c) of FIG. 4, the inner peripheral portion (inner peripheral wall 35inner) of the protrusion portion 35 of the rotatable polygon mirror 3 is engaged with the outer peripheral portion (outer peripheral wall 36outer) of the pedestal portion 36. Further, an inner surface of the center hole 34 is to be engaged with the rotating shaft 8 of the rotor, so the inner surface of the center hole 34 should not be damaged during the film forming process. Therefore, the inner surface of the center hole 34 is constituted to be loosely engaged with the part 507 (not to come in contact with one another). Thus, while the plurality of rotatable polygon mirrors 3 are skewered into the part 507, a length R33 from a center 507c of the part 507 to the reflecting surface 33 may differ for each rotatable polygon mirror. In a case that the length R33 varies, a film forming state may differ among the plurality of rotatable polygon mirrors. However, as described above, the inner peripheral portion of the protrusion portion 35 of the rotatable polygon mirror 3 (inner peripheral wall 35inner) is engaged with the outer peripheral portion of the pedestal portion 36 (outer peripheral wall 36outer). As a result, the length R33 is possible to be a same length among the plurality of rotatable polygon mirrors3. Incidentally, while the plurality of rotatable polygon mirrors 3 are skewered into the part 507, both ends of the part 507 in the axial direction are sealed so that an evaporation material does not enter between the plurality of rotatable polygon mirrors 3 through the center hole 34. Further, the top surface 35S of the rotatable polygon mirror 3 in the lower side is in contact with the surface 32 of the rotatable polygon mirror 3 in the upper side. Thus, an inner diameter of the center hole 34 of the rotatable polygon mirror 3 and the pedestal portion 36 of the rotatable polygon mirror 3 become a sealed structure (enclosed state). Incidentally, while the rotatable polygon mirrors 3 are stacked on the rotating shaft part 507, an uppermost one and a lowermost one of the rotatable polygon mirrors 3 in the axial direction of the rotating shaft part 507 are regulated in position by a regulating member (not shown).

By the constitution of the rotatable polygon mirror 3 described above, the center hole 34 of the rotatable polygon mirror 3 and the top surface portion 36S of the pedestal portion 36 of the rotatable polygon mirror 3, which are joint surfaces with the rotor 7 when assembling the optical deflecting device 1, do not scrape each other during an evaporation process by the vacuum evaporating device 500. As a result, it is possible to prevent a reduction in accuracy of the rotatable polygon mirror 3 due to scratching and scraping. Further, since the pedestal portion 36 is inside the protrusion portion 35 when the plurality of rotatable polygon mirrors 3 are stacked, the evaporation material is not adhered to the top surface portion 36S which is a mounting surface in contact with the rotor 7 of the supporting portion 2. Therefore, while mechanical accuracy of the top surface portion 36S of the pedestal portion 36 is assured, it is possible to accurately assemble it to the optical deflecting device 1. As a result, a reduction in optical performance due to the plane tilt (plane tilt of reflecting surface 33), surface deformation (deformation of the reflecting surface 33), etc. caused by the rotatable polygon mirror 3 is prevented, and it is possible to improve reliability of the scanning optical device 101.

Further, the multilayer film, which is the reflecting surface 33, is formed across each of the first surface 31 and the second surface 32 during the evaporation process by the vacuum evaporating device 500. As shown in part (b) of FIG. 5, a gap G is formed so that ridge portions of the reflecting surfaces 33 of the rotatable polygon mirrors 3 adjacent to each other in a vertical direction do not come into contact with each other. As a result, the reflecting surfaces 33 of the rotatable polygon mirrors 3 adjacent to each other in the vertical direction are possible to securely ensure an appropriate clearance (gap) for stably forming film. And since an intermediary part such as a spacer in order to provide a gap between the adjacent rotatable polygon mirrors 3 in the vertical direction is not used, it is possible to minimize an equipment and to make a forming film method of the rotatable polygon mirrors 3 inexpensive and highly productive.

Furthermore, when the plurality of rotatable polygon mirrors 3 are stacked on the rotating shaft part 507, the rotatable polygon mirror 3 is subjected to shear stress due to their weight and positional regulation, and, in particular, surface deformation of the rotatable polygon mirrors 3 is concerned. However, since a structure of the rotatable polygon mirror 3 is designed to hold an opposing portion of the protrusion portion 35 of the rotatable polygon mirror 3, which is subject to shear stress, by the adjacent rotatable polygon mirror 3, it is possible to suppress the surface deformation of the reflecting surface 33. In this way, it is possible to assure the mechanical accuracy of the reflecting surface 33 during the film formation and to improve reliability.

Incidentally, shapes of the protrusion portion 35 and the pedestal portion 36 in the embodiment may be protrude in the direction of the rotational axis of the rotatable polygon mirror 3 more than the reflecting surface 33, and may be a dimensional relationship in which the inner peripheral portion of the protrusion portion 35 is engaged with at least a part of the outer peripheral portion of the pedestal portion 36. For example, in a case that there is a small gap or rattling, as long as the shapes are such that the pedestal portion 36 of the rotatable polygon mirror 3 enters inside the protrusion portion 35 of the rotatable polygon mirror 3, the shapes of the protrusion portion 35 and the pedestal portion 36 may not be same as ones shown in FIG. 4, parts (a) to (c).

As described above, according to the embodiment, it is possible to prevent the accurate surface which affects the assembly accuracy of the rotatable polygon mirror from forming film during the film forming process of the rotatable polygon mirror.

Embodiment 2

The shapes of the protrusion portion and the pedestal portion of the rotatable polygon mirror in the embodiment 1 are annular shapes which are concentric circles centered on the rotational axis of the rotatable polygon mirror. In an embodiment 2, the rotatable polygon mirror with different shapes of the protrusion portion and the pedestal portion from ones in the embodiment 1.
[Constitution of the Rotatable Polygon Mirror]

Figure 6:
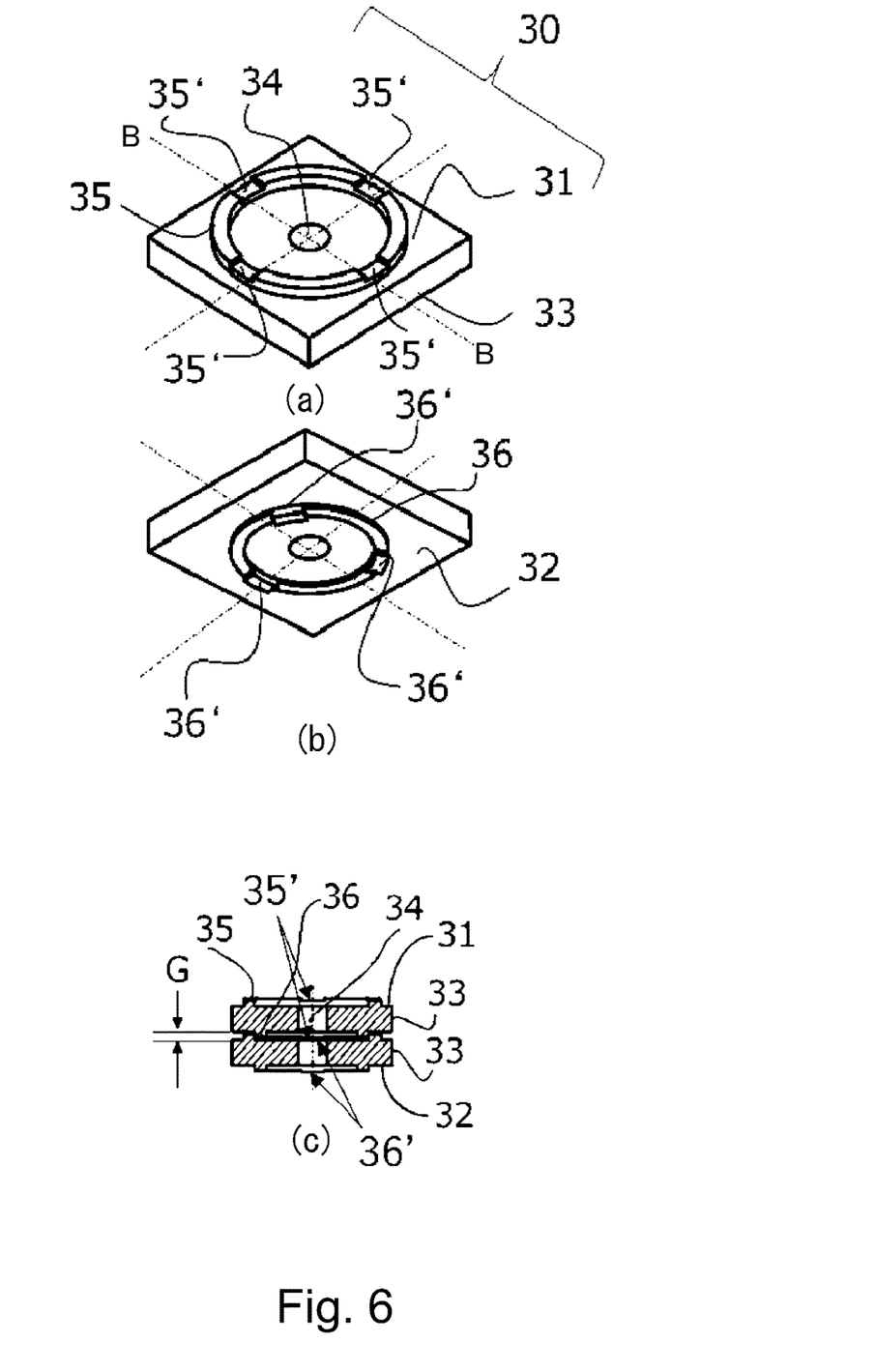
FIG. 6, parts (a) to (c), is a view illustrating a constitution of the rotatable polygon mirror according to the second embodiment.

FIG. 6, parts (a) to (c) is a schematic view illustrating of a shape of a rotatable polygon mirror 30 in the embodiment. Part (a) of FIG. 6 is a perspective view of the rotatable polygon mirror 30 when it is viewed from diagonally above, and part (b) of FIG. 6 is a perspective view of the rotatable polygon mirror 30 when it is viewed from diagonally below. Further, part (c) of FIG. 6 is a sectional view of the rotatable polygon mirrors 30 when they are cut along line B-B in a state that two of the rotatable polygon mirrors 30 are stacked as shown in part (a) of FIG. 6.

The rotatable polygon mirror 30 in the embodiment is formed from a resin material, similar to the rotatable polygon mirror 3 in the embodiment 1. Further, the rotatable polygon mirror 30 is in a form of a prism shape with a square bottom, similar to the rotatable polygon mirror 3 in the embodiment 1. And the rotatable polygon mirror 30 includes the reflecting surface 33 which forms four side surfaces of the square, a first surface 31 which is a top surface which is perpendicular to the four reflecting surfaces 33, and the second surface 32 which is a bottom surface perpendicular to the four reflecting surface 33 and is opposed to and substantially parallel to the first surface. Furthermore, the rotatable polygon mirror 30 includes the center hole 34 which engages with the rotational shaft 8 of the rotor 7 of the optical deflecting device 1 and is a rotational center.

Further, the first surface 31 of the rotatable polygon mirror 30 is provided with the concentric (coaxial) annular shaped protrusion portion 35 which is centered on the rotational shaft 8 in the direction of the rotational shaft 8 which is engaged with the rotatable polygon mirror 30. And four recessed portions 35', which are formed by cutting the protrusion portions 35, are provided at substantially equal intervals for a purpose of gate releasing when the rotatable polygon mirror 30 is formed, for example. Therefore, the top surface portion of the protrusion portion 35 is not a constant height like in the embodiment 1, but is a flat surface with steps at the recessed portions 35'. Further, in the second surface 32 of the rotatable polygon mirror 30, a concentric (coaxial) annular pedestal portion 36 which is centered on the rotational shaft 8 is provided in the opposite direction to the protruding direction of the protrusion portion 35 with respect to the rotational shaft 8 with which the rotatable polygon mirror 30 is engaged. And in order to assemble the rotatable polygon mirror 30 stably to the supporting portion 2 in a side of the rotor 7, the accurate surfaces, which are abutted with the supporting portion 2 of the rotor 7, are limited to only three portions of the convex portions 36' which are protruded from the top surface portion of the pedestal portion 36. And when the plurality of rotatable polygon mirrors 30 in the embodiment are stacked around the center hole 34 through which the rotational axis passes, the rotatable polygon mirror 30 is constituted that the inner peripheral wall of the inner peripheral portion of the protrusion portion 35 is engaged with at least a part of the outer peripheral wall of the outer peripheral portion of the pedestal portion 36.

Part (c) of FIG. 6 is a sectional view of the rotatable polygon mirrors 30 when they are cut along line B-B in a state that two of the rotatable polygon mirrors 30, which are shown in part (a) of FIG. 6, are stacked on top of each other, and is also a schematic view showing a close-up of the rotatable polygon mirrors 30 in a state of a section when the rotatable polygon mirrors 30 are stacked on the rotating shaft part 507 of the vacuum evaporating device 500 in the embodiment 1. The rotatable polygon mirrors 30 are stacked in an axial direction of the rotating shaft part 507 so that the first surface 31 faces upward. At this time, the gap G is formed. Incidentally, in a case that the rotatable polygon mirrors 30 are stacked on the rotating shaft part 507, an uppermost one and a lowermost one of the rotatable polygon mirrors 30 in the axial direction of the rotating shaft part 507 are regulated in position by the regulating member (not shown).

The inner diameter of the center hole 34 of the rotatable polygon mirror 30 and the pedestal portion 36 of the rotatable polygon mirror 30 become a sealed structure (enclosed state), when the inner peripheral wall of the inner peripheral portion of the protrusion portion 35 of the rotatable polygon mirror 30 is engaged with at least a part of the outer peripheral wall of the outer peripheral portion of the pedestal portion 36 of the rotatable polygon mirror 30. In this way, the inner diameter of the center hole 34 of the rotatable polygon mirror 30 and the convex portion 36' of the pedestal portion 36 of the rotatable polygon mirror 30 are sealed. As a result, it is possible to prevent reduction in surface accuracy of the convex portion 36' which is a mounting surface.

Further, by providing recessed portion shape or convex portion shape in the protrusion portion 35 and the pedestal portion 36 of the rotatable polygon mirror 30, it is possible to expand degree of freedom for designing the protrusion portion 35 and the pedestal portion 36. For example, the rotatable polygon mirror 30 may vibrate during rotation due to unbalance caused by an accuracy error of the reflecting surface 33 of the laser light or a fact that a rotational center is not perfectly arranged at an engaging portion between the center hole 34 and the rotational shaft. Therefore, for a purpose of preventing the vibration caused by the unbalance, it is possible to provide an adhesive portion, in which a light curing type adhesive, etc. is applied and adhered, with the protrusion portion 35 of the rotatable polygon mirror 30 in order to prevent the vibration by correcting a balance.

As described above, according to the embodiment, it is possible to prevent the accurate surface which affects the assembly accuracy of the rotatable polygon mirror from forming film during the film forming process of the rotatable polygon mirror.

Embodiment 3

The shapes of the protruding portion and the pedestal portion of the rotatable polygon mirrors in the embodiment 1 and the embodiment 2 are annular shapes which are concentric circles centered on the rotational axis of the rotatable polygon mirror. In an embodiment 3, the rotatable polygon mirror which includes the protrusion portion and the pedestal portion with different shapes from the embodiment 1 and the embodiment 2.

[Constitution of the Rotatable Polygon Mirror]

Figure 7:
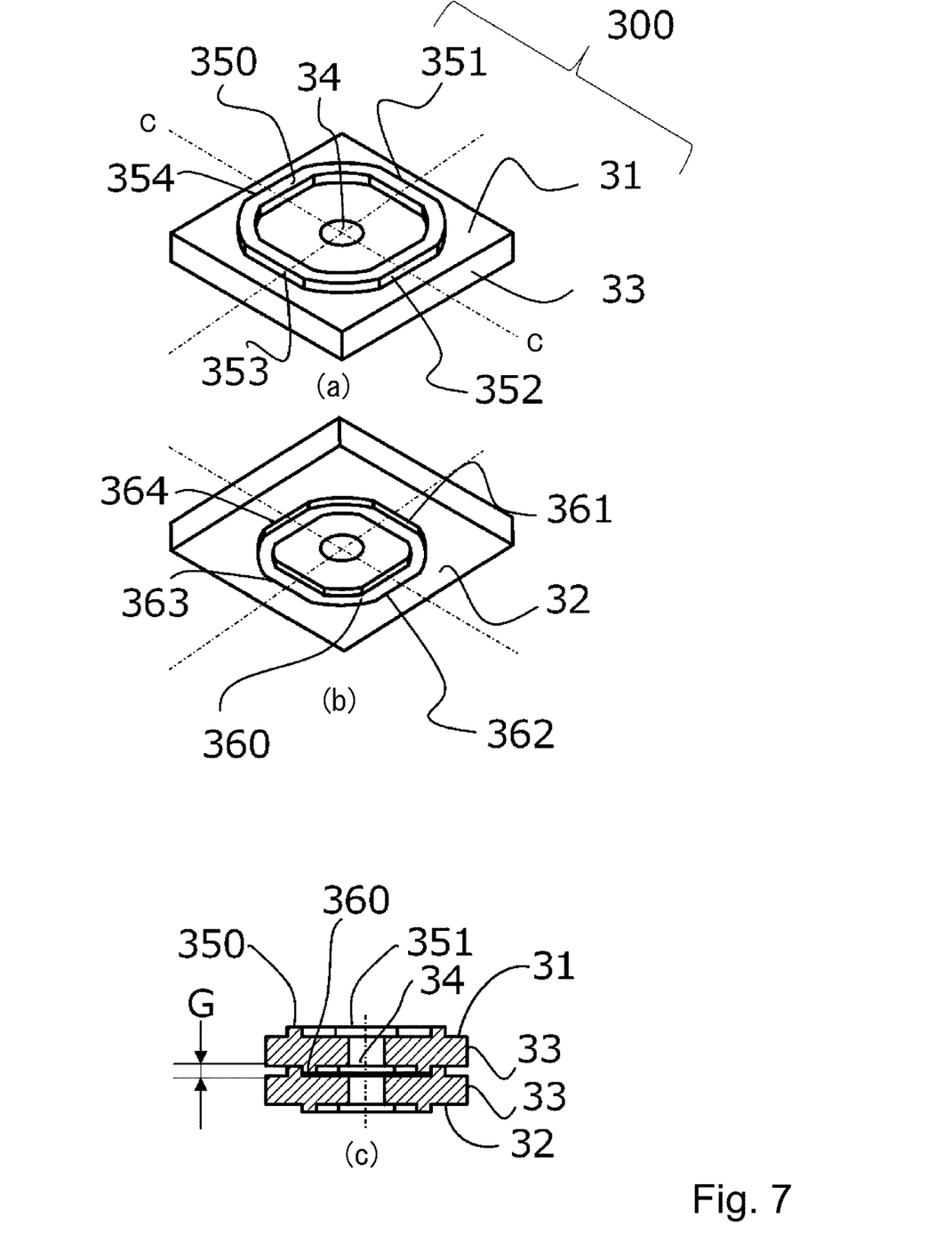
FIG. 7, parts (a) to (c), is a view illustrating the constitution of the rotatable polygon mirror according to the third embodiment.

FIG. 7 is a schematic view illustrating a shape of the rotatable polygon mirror 300 in the embodiment. Part (a) of FIG. 7 is a perspective view of the rotatable polygon mirror 300 when it is viewed from diagonally above, and part (b) of FIG. 7 is a perspective view of the rotatable polygon mirror 300 when it is viewed from diagonally below. Further, part (c) of FIG. 7 is a sectional view of the rotatable polygon mirrors 300 when they are cut along line C-C in a state that two of the rotatable polygon mirrors are stacked as shown in part (a) of FIG. 7.

The rotatable polygon mirror 300 in the embodiment is formed from a resin material, similar to the rotatable polygon mirror 3 in the embodiment 1 and the rotatable polygon mirror 30 in the embodiment 2. Further, the rotatable polygon mirror 300 is in a form of a prism shape with a square bottom, similar to the rotatable polygon mirror 3 in the embodiment 1 and the rotatable polygon mirror 30 in the embodiment 2. And the rotatable polygon mirror 300 includes the reflecting surface 33 which forms four side surfaces of the square, a first surface 31 which is a top surface which is perpendicular to the four reflecting surfaces 33, and the second surface 32 which is a bottom surface perpendicular to the four reflecting surface 33 and is opposed to and substantially parallel to the first surface 31. Furthermore, the rotatable polygon mirror 300 includes the center hole 34 which engages with the rotational shaft 8 of the rotor 7 of the optical deflecting device 1 and is the rotational center.

Further, the first surface 31 of the rotatable polygon mirror 300 is provided with an annular shaped protrusion portion 350 which is constituted that a D-cut portion 351, a D-cut portion 352, a D-cut portion 353, and a D-cut portion 354, which are arranged corresponding to each reflecting surface 33, are connected. Similarly, the second surface 32 of the rotatable polygon mirror 300 is provided with an annular shaped pedestal portion 360 which is constituted that a D-cut portion 361, a D-cut portion 362, a D-cut portion 363, and a D-cut portion 364, which are arranged corresponding to each reflecting surface 33, are connected. When the protrusion portion 350 and the pedestal portion 360 are divided by a line connecting a center of the central hole 34 which is the rotational axis of the rotatable polygon mirror 300, and vertices of both end portions of each reflecting surface 33, shapes of each area of the protrusion portion 350 and the pedestal portion 360, which are divided, are identical shapes and rotationally symmetrical shapes around the rotational axis.

The D-cut portion 351, the D-cut portion 352, the D-cut portion 353, and the D-cut portion 354 of the protrusion portion 350 which are formed on the first surface 31, and the D-cut portion 361, the D-cut portion 362, the D-cut portion 363, and the D-cut portion 364 of the pedestal portion 360 which are formed on the second surface 32, correspond to each reflecting surface 33. And, as shown in part (c) of FIG. 7, for each 90 degree phase of the reflecting surface 33, the D-cut portion of the protrusion portion 350 and the D-cut portion of the pedestal portion 360, which are corresponded, are determined, and the rotatable polygon mirror 300 is constituted that the inner wall of the D-cut portion of the protrusion portion 350 and the outer wall of the pedestal portion 360, which are corresponded, are engaged. Further, as shown in part (c) of FIG. 7, the rotatable polygon mirror 300 is constituted that a height of the pedestal portion 360 from the second surface 32 is lower than a height of the protrusion portion 350 from the first surface 31. Thus, as shown in part (c) of FIG. 7, when the rotatable polygon mirrors 300 are stacked, a top surface portion of the protrusion portion 350 of the rotatable polygon mirror 300 in a lower side is abutted with the second surface 32 of the rotatable polygon mirror 300 in an upper side. On the other hand, a top surface portion of the pedestal portion 360 of the rotatable polygon mirror 300 in the upper side is not abutted with the first surface 31 of the rotatable polygon mirror 3 in the lower side, and a gap (clearance) is provided. Further, the gap G is formed depending on a height in which the protrusion portion 350 of the rotatable polygon mirror 300 and the pedestal portion 360 of the rotatable polygon mirror 300 are engaged.

Part (c) of FIG. 7 is a sectional view of the rotatable polygon mirrors 300 when they are cut along line C-C in a state that two of the rotatable polygon mirrors 300, which are shown in part (a) of FIG. 7, are stacked on top of each other, and is also a schematic view showing a close-up of the rotatable polygon mirrors 300 in a state of a section when the rotatable polygon mirrors 300 are stacked on the rotating shaft part 507 of the vacuum evaporating device 500 in the embodiment 1. The rotatable polygon mirrors 300 are stacked in the axial direction of the rotating shaft part 507 so that the first surface 31 faces upward. Incidentally, in a case that the rotatable polygon mirrors 300 are stacked on the rotating shaft part 507, an uppermost one and a lowermost one of the rotatable polygon mirrors 300 in the axial direction of the rotating shaft part 507 are regulated in position by the regulating member (not shown).

Due to the D-cut shapes of the protrusion portion 350 of the rotatable polygon mirror 300 and the pedestal portion 360 of the rotatable polygon mirror 300 described above, it is possible to securely align rotational phases of the reflecting surfaces 33 of each rotatable polygon mirror 300 in which film is formed during an evaporation by using the vacuum evaporating device 500. As a result, it is possible to ensure high quality and stable mass production of the rotatable polygon mirrors 300, since it is prevented that the reflecting surfaces 33, which are overlapping each other, are hidden and variations are occurred in states of film formations on each of the reflecting surfaces 33 which are adjacent to each other in a vertical direction by shifting of the rotational phases of the plurality of rotatable polygon mirrors 300.

As described above, the rotatable polygon mirror 300 in the embodiment is possible to achieve the same effects as in the embodiments described above, and in addition, it is possible to prevent the variations in the states of film formations of the reflecting surfaces 33 since it is possible to securely align the rotational phases of the reflecting surfaces 33.

As described above, according to the embodiment, it is possible to prevent the accurate surface which affects the assembly accuracy of the rotatable polygon mirror from forming film during the film forming process of the rotatable polygon mirror.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-087164 filed on May 24, 2021, which is hereby incorporated by reference herein in its entirety.

What is claimed is:

1. A rotatable polygon mirror including a plurality of reflecting surfaces comprising:
    a first surface connecting to said plurality of reflecting surfaces;
    a second surface connecting to said plurality of reflecting surfaces and provided on a side opposite to said first surface with respect to a rotational axis direction;
    a first protrusion portion with an annular shape, provided on said first surface and protruding in the rotational axis direction, about a rotational axis of said rotatable polygon mirror; and
    a second protrusion portion with an annular shape, provided on said second surface and protruding in an opposite direction to a protrusion direction of said first protrusion portion, about the rotational axis of said rotatable polygon mirror,
    wherein a top surface portion of said second protrusion portion is a part to be set on a rotor of a motor,
    wherein a height of a top surface portion of said first protrusion portion from said first surface is higher than a height of the top surface portion of said second protrusion portion from said second surface with respect to the rotational axis direction, and
    wherein, in a case that a plurality of said rotatable polygon mirrors are stacked in the rotational axis direction, a wall of an inner peripheral side of a first protrusion portion of a first rotatable mirror and a wall of an outer peripheral side of a second protrusion portion of a second rotatable mirror are engaged with each other.

2. A rotatable polygon mirror according to claim 1, wherein said top surface portion of said first protrusion portion is a plane which has an unchanging height from said first surface.

3. A rotatable polygon mirror according to claim 2, wherein said top surface portion of said second protrusion portion is a plane which has an unchanging height from said second surface.

4. A rotatable polygon mirror according to claim 1, wherein said top surface portion of said first protrusion portion includes a plurality of recessed portions provided at substantially equal intervals in a rotational direction of said rotatable polygon mirror.

5. A rotatable polygon mirror according to claim 4, wherein said top surface portion of said second protrusion portion includes a plurality of convex portions provided at substantially equal intervals in the rotational direction of said rotatable polygon mirrors.

6. A rotatable polygon mirror according to claim 5, wherein said top surface portion of said first protrusion portion includes four said recessed portions, and
wherein said top surface portion of said second protrusion portion includes three said convex portions.

7. An optical deflection device comprising:
a rotatable polygon mirror according to claim 1, said rotatable polygon mirror including said plurality of reflecting surfaces configured to reflect a laser light; and
a motor configured to drive said rotatable polygon mirror.

8. An image forming apparatus comprising:
an image forming portion provided with a photosensitive drum, and configured to form an image on a recording material; and
a scanning optical device according to claim 7, said scanning optical device being provided with a light source and being configured to irradiate said photosensitive drum of said image forming portion with the laser light emitted from said light source to form an electrostatic latent image.

9. A rotatable polygon mirror including a plurality of reflecting surfaces comprising:
a first surface connecting to said plurality of reflecting surfaces;
a second surface connecting to said plurality of reflecting surfaces and provided on a side opposite to said first surface with respect to a rotational axis direction;
a first protrusion portion with an annular shape, provided on said first surface and protruding in the rotational axis direction, about a rotational axis of said rotatable polygon mirror; and
a second protrusion portion with an annular shape, provided on said second surface and protruding in an opposite direction to a protrusion direction of said first protrusion portion, about the rotational axis of said rotatable polygon mirror,
wherein a top surface portion of said second protrusion portion is a part to be set on a rotor of a motor,
wherein a height of a top surface portion of said first protrusion portion from said first surface is higher than a height of the top surface portion of said second protrusion portion from said second surface with respect to the rotational axis direction, and
wherein a diameter of the first protrusion portion is larger than a diameter of the second protrusion portion.

10. A rotatable polygon mirror according to claim 9, wherein said top surface portion of said first protrusion portion is a plane which has an unchanging height from said first surface.

11. A rotatable polygon mirror according to claim 10, wherein said top surface portion of said second protrusion portion is a plane which has an unchanging height from said second surface.

12. A rotatable polygon mirror according to claim 9, wherein said top surface portion of said first protrusion portion includes a plurality of recessed portions provided at substantially equal intervals in a rotational direction of said rotatable polygon mirror.

13. A rotatable polygon mirror according to claim 12, wherein said top surface portion of said second protrusion portion includes a plurality of convex portions provided at substantially equal intervals in the rotational direction of said rotatable polygon mirrors.

14. An optical deflection device comprising:
a rotatable polygon mirror according to claim 9, said rotatable polygon mirror including said plurality of reflecting surfaces configured to reflect a laser light; and
a motor configured to drive said rotatable polygon mirror.

15. An image forming apparatus comprising:
an image forming portion provided with a photosensitive drum, and configured to form an image on a recording material; and
a scanning optical device according to claim 14, said scanning optical device being provided with a light source and being configured to irradiate said photosensitive drum of said image forming portion with the laser light emitted from said light source to form an electrostatic latent image.

* * * * *